(12) United States Patent
Miyagawa

(10) Patent No.: US 8,398,280 B2
(45) Date of Patent: Mar. 19, 2013

(54) LIGHTING SYSTEM

(75) Inventor: Toru Miyagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 372 days.

(21) Appl. No.: 12/813,455

(22) Filed: Jun. 10, 2010

(65) Prior Publication Data

US 2010/0328963 A1    Dec. 30, 2010

(30) Foreign Application Priority Data

Jun. 30, 2009   (JP) ................................. 2009-155764

(51) Int. Cl.
*B62J 6/02* (2006.01)
*B62J 6/00* (2006.01)
*F21V 33/00* (2006.01)
*B60Q 1/04* (2006.01)

(52) U.S. Cl. ........ 362/476; 362/475; 362/546; 362/231; 362/800; 362/249.02

(58) Field of Classification Search .......... 362/473–476, 362/546–549, 227, 228, 231, 800, 249.02, 362/249.06
See application file for complete search history.

(56) References Cited

U.S. PATENT DOCUMENTS

| | | | | |
|---|---|---|---|---|
| 2,190,035 | A | * | 2/1940 | Loungway ..................... 362/227 |
| 5,685,637 | A | * | 11/1997 | Chapman et al. ............. 362/263 |
| 5,984,494 | A | * | 11/1999 | Chapman et al. ............. 362/470 |
| 6,641,295 | B1 | * | 11/2003 | Hu ................................ 362/545 |
| 6,984,062 | B2 | * | 1/2006 | Yeh .............................. 362/544 |
| 7,144,144 | B2 | * | 12/2006 | Hsu .............................. 362/543 |
| 7,854,538 | B2 | * | 12/2010 | Helms .......................... 362/545 |
| 8,066,391 | B2 | * | 11/2011 | Zhong ............................. 362/20 |
| 2007/0002573 | A1 | | 1/2007 | Aron | |

FOREIGN PATENT DOCUMENTS

| | | |
|---|---|---|
| DE | 200 22 184 | 10/2001 |
| DE | 103 28 576 | 1/2005 |
| JP | 2002-216509 | 8/2002 |
| JP | 2007213967 A * | 8/2007 |

OTHER PUBLICATIONS

Extended European Search Report for corresponding EP Application No. 10166249, Oct. 4, 2010.

* cited by examiner

*Primary Examiner* — Mariceli Santiago

(74) *Attorney, Agent, or Firm* — Ditthavong Mori & Steiner, P.C.

(57) ABSTRACT

A lighting system includes a first lighting apparatus, an annular second lighting apparatus, and an annular stay. The first lighting apparatus includes a light source covered with a housing. The annular second lighting apparatus is disposed around the housing and includes a plurality of light-emitting elements disposed annularly so as to be radially spaced apart from an outer periphery of the first lighting apparatus. The annular stay is supported by the housing to support the second lighting apparatus.

20 Claims, 9 Drawing Sheets

LIGHTING SYSTEM

CROSS-REFERENCE TO RELATED APPLICATIONS

The present application claims priority under 35 U.S.C. §119 to Japanese Patent Application No. 2009-155764, filed Jun. 30, 2009. The contents of this application are incorporated herein by reference in their entirety.

BACKGROUND OF THE INVENTION

1. Field of the Invention

The present invention relates to a lighting system.

2. Discussion of the Background

A headlight system having a characteristic appearance as a lighting apparatus is proposed for a saddle-riding type vehicle. To illuminate a forward portion of the saddle-riding type vehicle, the headlight system includes a first lighting apparatus having a circular light-emitting surface and a second lighting apparatus forming an annular light-emitting surface concentric with the light-emitting surface of the first lighting apparatus (see, for example, Japanese Patent Laid-Open No. 2002-216509 (FIG. 5)).

Referring to FIG. 5 of Japanese Patent Laid-Open No. 2002-216509, a first light source 63 is supported by a first housing 62 and a reflector of a second lighting apparatus is disposed so as to surround the first housing 62. Further, a second light source 65 is supported by the reflector of the second lighting apparatus.

As evident from FIG. 5 of Japanese Patent Laid-Open No. 2002-216509, the first housing 62 and the reflector of the second lighting apparatus are dual, so that the entire lighting system becomes extremely heavy. Further, the arrangement in which the first housing 62 is disposed forwardly of the reflector of the second lighting apparatus poses a problem in that it is difficult to set a reflection surface of the reflector of the second lighting apparatus for uniformly illuminating a second light-emitting surface.

There is, however, a need for reduction in weight of the lighting system used for a small vehicle which is required to be compact and lightweight and, particularly, for the saddle-riding type vehicle.

SUMMARY OF THE INVENTION

According to an aspect of the present invention, a lighting system includes a first lighting apparatus, an annular second lighting apparatus, and an annular stay. The first lighting apparatus includes a light source covered with a housing. The annular second lighting apparatus is disposed around the housing and includes a plurality of light-emitting elements disposed annularly so as to be radially spaced apart from an outer periphery of the first lighting apparatus. The annular stay is supported by the housing to support the second lighting apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
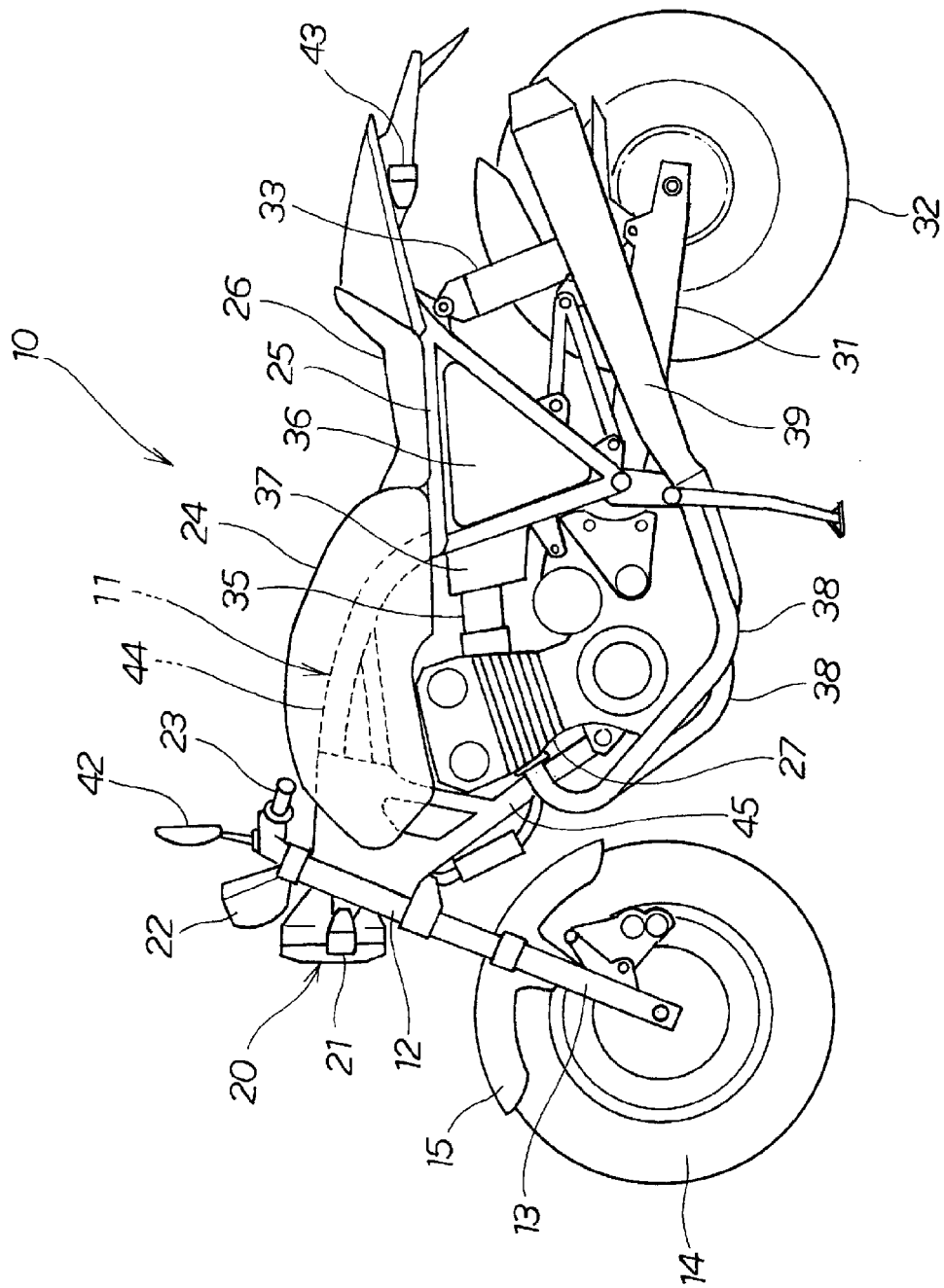
FIG. 1 is a diagram for illustrating a saddle-riding type vehicle mounted with a lighting system according to an embodiment of the present invention.

Specific embodiments to which the present invention is applied will be described below with reference to the accompanying drawings. The drawings should be viewed in the direction of reference numerals.

First Embodiment

A lighting system according to a first embodiment of the present invention will be described with reference to the drawings.

Referring to FIG. 1, a saddle-riding type vehicle 10 or other type of motorcycle includes a vehicle body frame 11, a front fork 13, a front wheel 14, a front fender 15, a headlight 20, front flashers 21, a meter 22, a steering handlebar 23, a fuel tank 24, a seat 26, an engine 27, a swing arm 31, a rear wheel 32, and a rear cushion 33. Specifically, the front fork 13 is steerably mounted on a head pipe 12 disposed at a leading end of the vehicle body frame 11. The front wheel 14 is rotatably mounted at a lower end of the front fork 13. The front fender 15 is mounted on the front fork 13. The front fender 15 blocks mud or stones thrown up by the front wheel 14. The headlight 20 as a lighting system is mounted at a front portion of the head pipe 12. The front flashers 21 as a lighting system are disposed in pairs in a front-to-back-side direction of FIG. 1 so as to sandwich the headlight 20. The fuel tank 24 is disposed on the vehicle body frame 11. The seat 26 is mounted on a seat rail 25 that is extended rearwardly from the vehicle body frame 11. The engine 27 is suspended on the vehicle body frame 11. The swing arm 31 is extended from a lower portion of a rear portion of the vehicle body frame 11. The rear wheel 32 is rotatably mounted at a rear portion of the swing arm 31. The rear cushion 33 connects between the swing arm 31 and the seat rail 25, controlling vertical movements of the rear wheel 32.

An intake pipe 35 is connected to the engine 27. A mixture that is purified by an air cleaner 36 disposed downwardly of the seat 26 and mixed with fuel by a carburetor 37 is supplied through the intake pipe 35 to the engine 27.

In addition, exhaust pipes 38, 38 are extended from the engine 27 and a muffler 39 is connected to the exhaust pipes 38, 38.

A rearview mirror 42 is mounted on the steering handlebar 23. A rear flasher 43 as a lighting system is disposed rearwardly of the seat 26.

The vehicle body frame 11 includes the head pipe 12, a main frame 44, the seat rail 25, and a down frame 45. The head pipe 12 forms a front end of the vehicle body frame 11. The main frame 44 is extended obliquely downwardly toward the rear from the head pipe 12. The seat rail 25 is extended rearwardly from a rear end of the main frame 44. The down frame 45 is extended obliquely downwardly toward the rear from a front end of the main frame 44.

The embodiment of the present invention will be described below with reference to the headlight 20 as an example.

Figure 2:
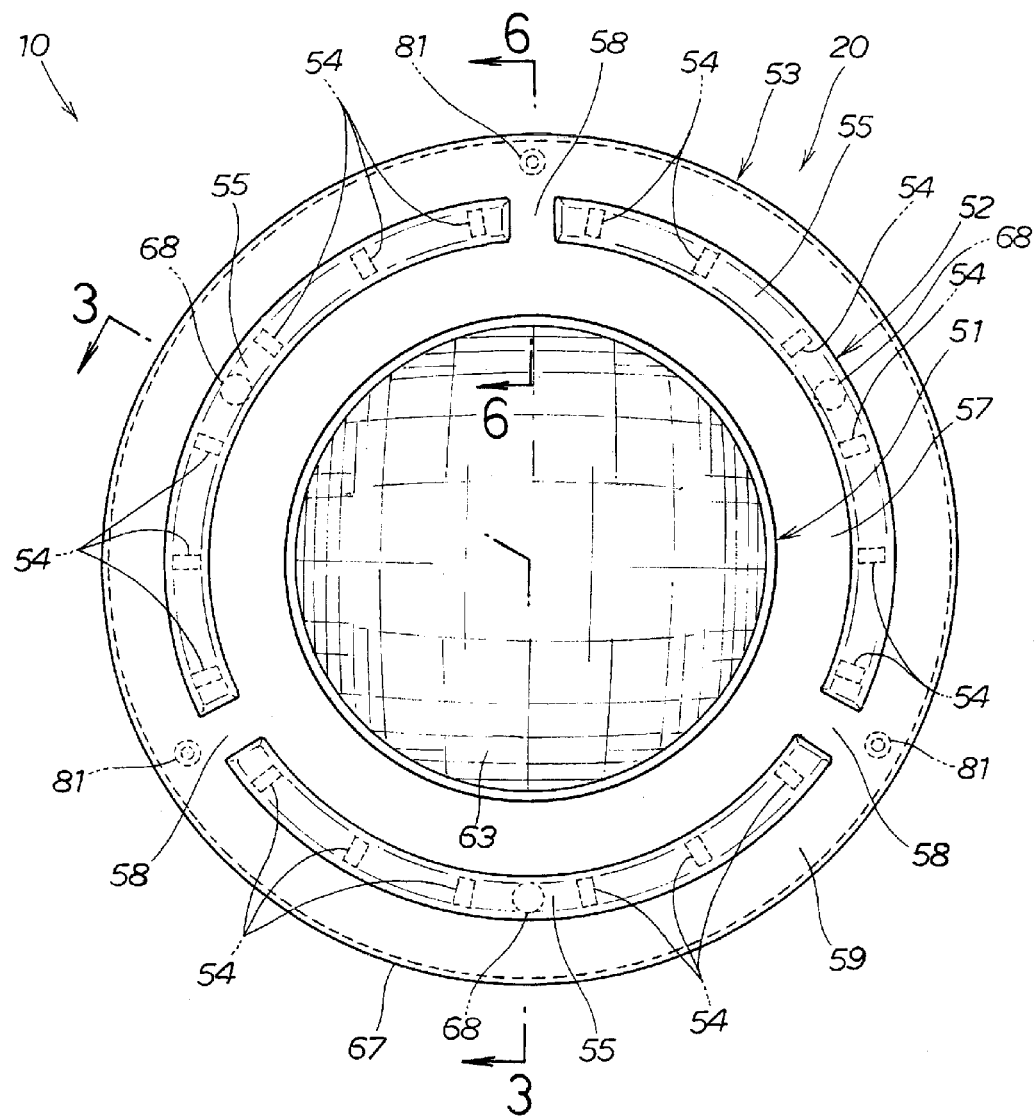
FIG. 2 is a front elevational view showing the lighting system according to a first embodiment of the present invention.

Referring to FIG. 2, the headlight 20 includes a first lighting apparatus 51, an annular stay (identified by reference numeral 65 in FIG. 3), a second lighting apparatus 52, and a lighting system cover 53. Specifically, the annular stay 65 surrounds the first lighting apparatus 51. The second lighting apparatus 52 is supported by the annular stay 65. The lighting system cover 53 is fitted so as to cover the second lighting apparatus 52.

The second lighting apparatus 52 includes light-emitting elements 54, such as light-emitting diodes, disposed at predetermined intervals. The light-emitting elements 54 are disposed annularly so as to be radially spaced apart from an outer periphery of the first lighting apparatus 51. A lens 55 is placed over the light-emitting elements 54.

The lighting system cover 53 includes a spacing portion cover 57, spokes 58, 58, 58, and an outer peripheral cover 59. Specifically, the spacing portion cover 57 covers a spacing portion (identified by reference numeral 66 in FIG. 3) that is formed between an outer periphery of the first lighting apparatus 51 and an inner periphery of the second lighting apparatus 52 to extend from the outer periphery of the first lighting apparatus 51 to the inner periphery of the second lighting apparatus 52. The spokes 58, 58, 58 extend radially from an outer periphery of the spacing portion cover 57. The outer peripheral cover 59 is connected by these spokes 58 to thereby be integrated with the spacing portion cover 57, thus covering the annular stay (identified by reference numeral 65 in FIG. 3).

Figure 3:
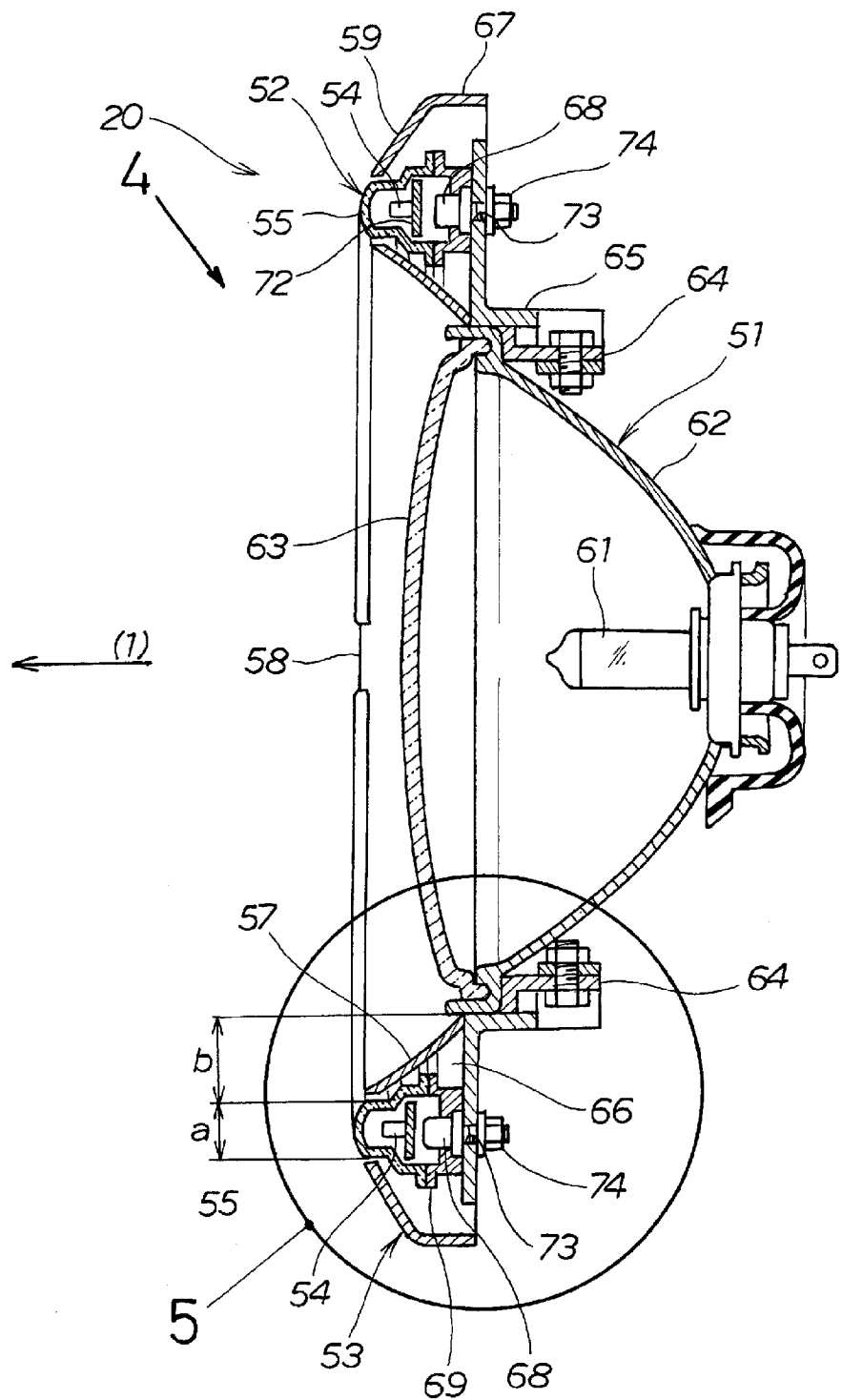
FIG. 3 is a cross-sectional view taken along line 3-3 of FIG. 2.

FIG. 3. In the descriptions that follow, an illuminating direction (arrow (1) of FIG. 3) will be referred to as being forward, while a direction opposite to the illuminating direction as being rearward.

Referring to FIG. 3, the headlight 20 includes the first lighting apparatus 51, the annular stay 65, the second lighting apparatus 52, and the lighting system cover 53. Specifically, the first lighting apparatus 51 is covered with a first lighting apparatus lens 63 and includes a light source 61 covered in a rear thereof by a housing 62. The annular stay 65 is connected to, and thereby supported by, housing stays 64, 64 disposed on an outer periphery of the housing 62. The annular stay 65 is thus annularly formed. The second lighting apparatus 52 of an annular shape is supported by the annular stay 65 and disposed around the housing 62. The lighting system cover 53 is placed over the second lighting apparatus 52 and covers from the forward direction the annular stay 65 and the spacing portion 66 between the first lighting apparatus 51 and the second lighting apparatus 52.

The lighting system cover 53 includes the spacing portion cover 57 for covering the spacing portion 66. The spacing portion cover 57 that covers the spacing portion 66 improves appearance of the headlight 20.

The lighting system cover 53 further includes the outer peripheral cover 59 that is extended from the outer periphery of the second lighting apparatus 52 to cover the annular stay 65. The outer peripheral cover 59 that covers the annular stay 65 hides the annular stay 65, thus improving appearance of the headlight 20.

In addition, a side cover 67 extended rearwardly from an edge of the outer peripheral cover 59 is integrally formed with the outer peripheral cover 59. When the headlight 20 is viewed from a side, therefore, the side cover 67 covers and hides the annular stay 65 to thereby further enhance the appearance of the headlight 20.

In addition, the side cover 67 integrally formed with the outer peripheral cover 59 helps promote reduction in the number of parts used.

The first lighting apparatus 51 and the second lighting apparatus 52 are radially spaced apart from each other. Preferably, a width b of the spacing portion cover 57 is set to be greater than a width a of the second lighting apparatus 52. Assume that the first lighting apparatus 51 is the black part of the eye and the second lighting apparatus 52 is the white part of the eye. The first lighting apparatus 51 and the second lighting apparatus 52 then effectively form a shape that is readily reminiscent of the "eye."

The bolts 68 are disposed, in a view in the illuminating direction (front view), alternately relative to, and so as not to overlap, the light-emitting elements 54. Specifically, two adjoining light-emitting elements 54 sandwich a bolt 68. Disposing the bolts 68 and the light-emitting elements 54 in a manner of not interfering with each other allows a length of the second lighting apparatus 52 in a longitudinal direction (a crosswise direction of FIG. 3) to be short.

Figure 4:
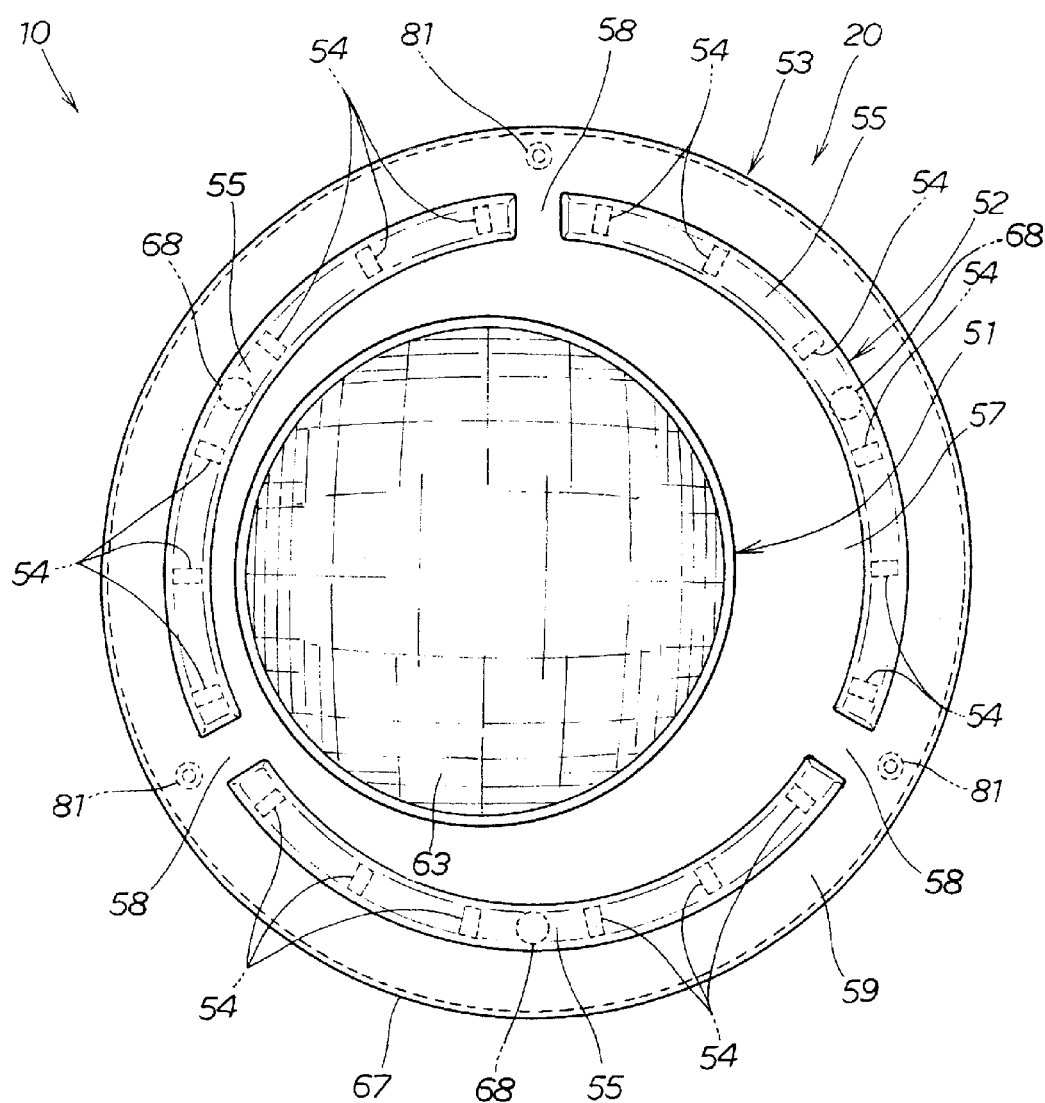
FIG. 4 is a view on arrow 4 of FIG. 3.

The following observation made with reference to FIG. 4 holds true from the arrangement in which the light-emitting elements 54 are disposed at a position protruding in the illuminating direction (the arrow (1) of FIG. 3) (leftward in FIG. 3) relative to the first lighting apparatus 51 in a side view.

Referring to FIG. 4, when a third person views the headlight 20 from an obliquely forward direction, the first lighting apparatus 51 looks closer on the side of the third person relative to a center of a circular ring of the second lighting apparatus 52. This produces an effect as if the black part of the eye were closer on the side of the third person (as if the first lighting apparatus 51 chased the third person).

Mounting of the second lighting apparatus 52 on the annular stay 65 will be described in detail below with reference to FIG. 5.

Figure 5:
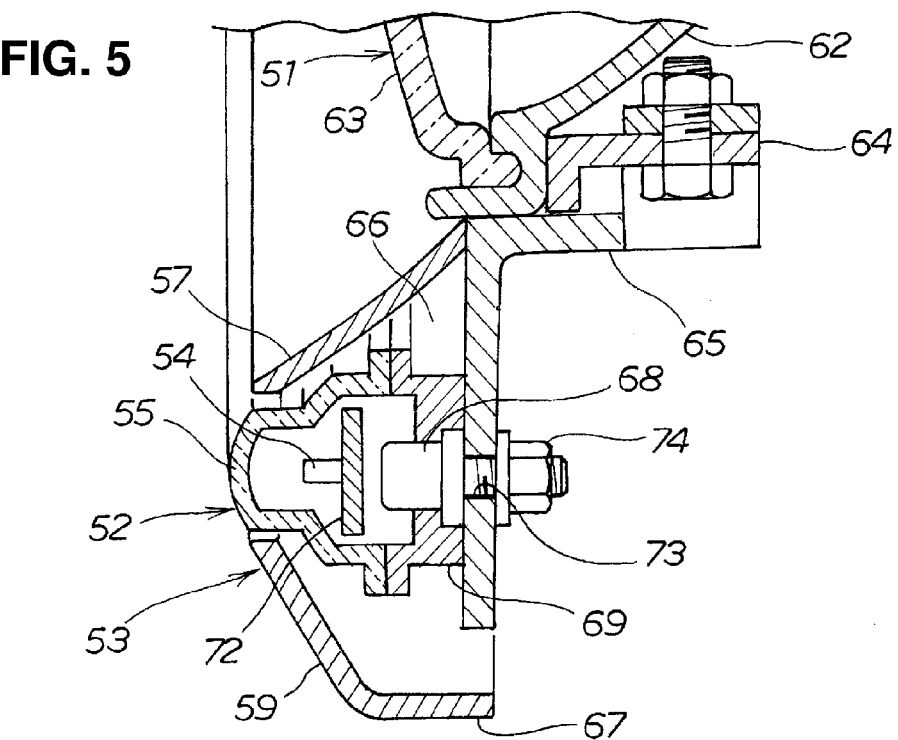
FIG. 5 is an enlarged view showing portion 5 of FIG. 3.

Referring to FIG. 5, the second lighting apparatus 52 includes a substrate housing 69, a substrate 72, and the lens 55. The bolt is installed in the substrate housing 69. The substrate 72, which is disposed forwardly (on the left side in FIG. 5) of the bolt 68, supports the light-emitting element (identified by reference numeral 54 in FIG. 2). The lens 55 is joined to the substrate housing 69 so as to cover the substrate 72.

The bolt 68 is an insert bolt embedded in the substrate housing 69.

The bolt 68 is passed through a mounting hole 73 in the annular stay 65 and secured in place with a nut 74 from an opposite side. This mounts the second lighting apparatus 52 on the annular stay 65.

The bolt 68 is previously embedded in the substrate housing 69 and the mounting hole 73 is previously machined in the annular stay 65. This allows the second lighting apparatus 52 to be mounted at an accurate position relative to the annular stay 65.

Figure 6:
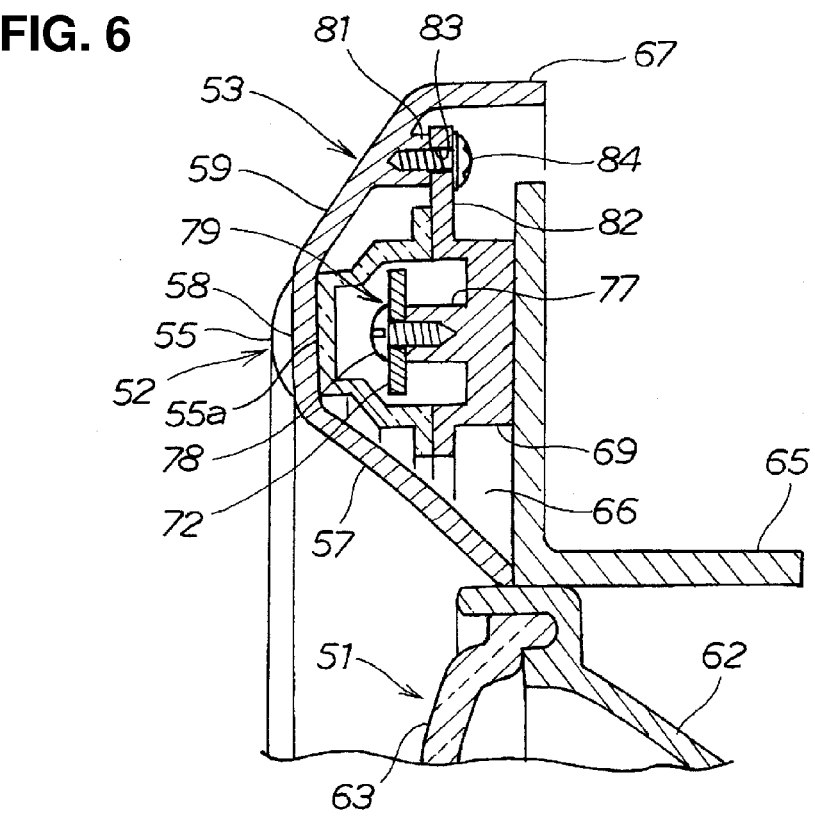
FIG. 6 is a cross-sectional view taken along line 6-6 of FIG. 2.

Referring to FIG. 6, the substrate 72 is fixed to a protruding portion 77 disposed on the substrate housing 69 with a screw 78. A mounting portion 79 of the substrate 72 is covered with the spoke 58. Specifically, the mounting portion 79 overlaps the spoke 58 when the headlight 20 is viewed from a forward direction in the illuminating direction.

Hiding the mounting portion 79 enhances appearance of the headlight 20.

Additionally, the substrate housing 69 includes an extension portion 82 that is extended toward a boss 81 disposed on the outer peripheral cover 59. An outer peripheral cover mounting hole 83 made in the extension portion 82 is aligned with the boss 81 and then a screw 84 is passed therethrough. This allows the outer peripheral cover 59 to be mounted on the substrate housing 69.

The outer peripheral cover 59 is integrally formed with the spacing portion cover 57 via the spoke 58. This arrangement allows the spacing portion cover 57 to be fixed in place by fixing the outer peripheral cover 59 to the substrate housing 69. The arrangement is beneficial in that it makes it necessary to dispose the boss 81 for fixing the spacing portion cover 57 and the outer peripheral cover 59 on only the outer peripheral cover 59 or reduces the number of fixing portions on the side of the spacing portion cover 57.

The reverse holds true if the boss is disposed on the side of the spacing portion cover 57. Specifically, fixing the spacing portion cover 57 to the substrate housing 69 allows the outer peripheral cover 59 to be fixed in place. The arrangement is beneficial in that it makes it necessary to dispose the boss for fixing the spacing portion cover 57 and the outer peripheral cover 59 on only the spacing portion cover 57 or reduces the number of fixing portions on the side of the outer peripheral cover 59.

The spoke 58 is disposed at the position of a lens recessed portion 55a. Aligning the spoke 58 with the lens recessed portion 55a allows the spoke 58 to be positioned correctly. This arrangement facilitates positioning and mounting of the spoke 58.

Assembly of the headlight 20 will be described below with reference to FIG. 7.

Figure 7:
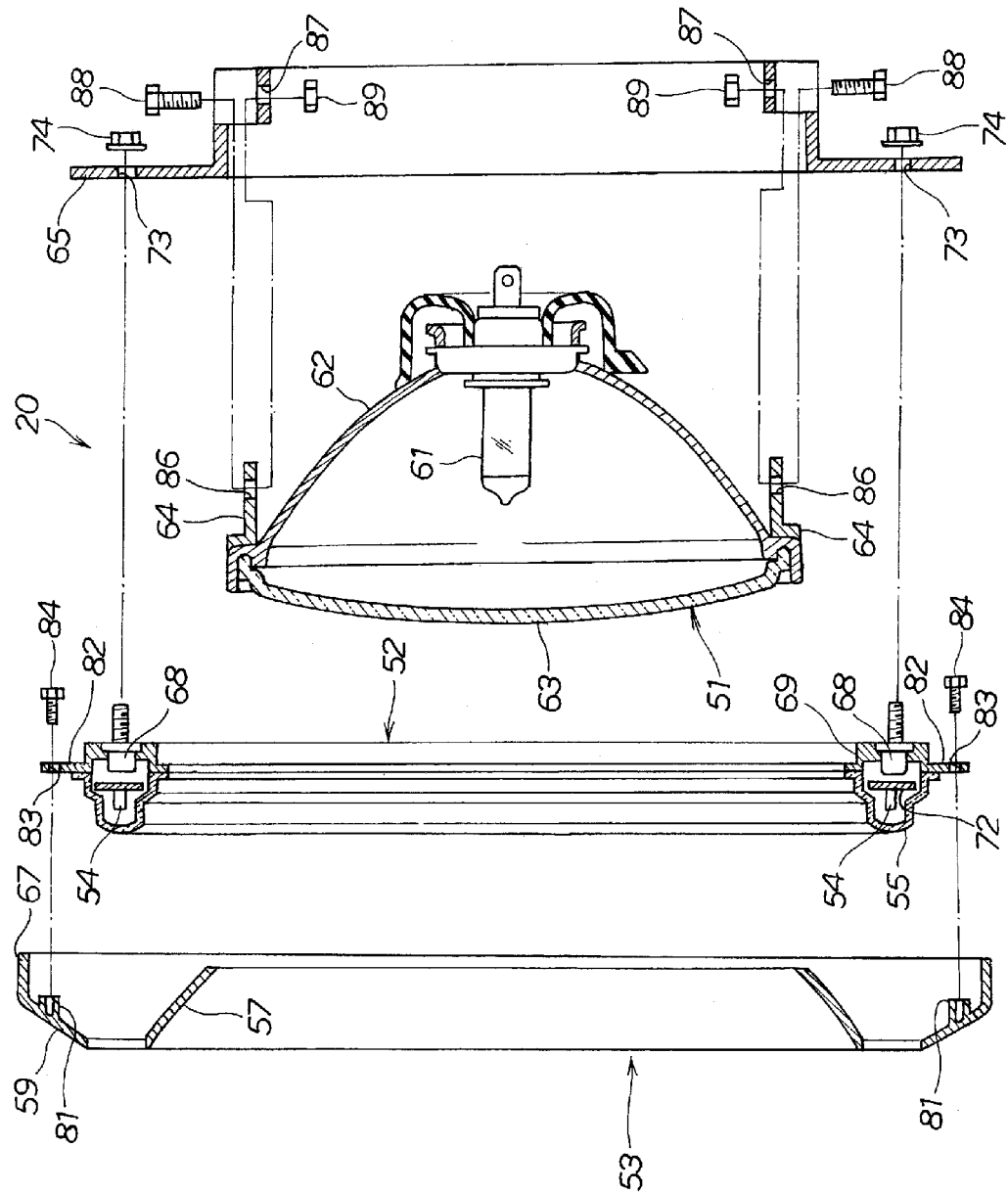
FIG. 7 is an exploded view showing the lighting system according to the first embodiment of the present invention.

Referring to FIG. 7, mounting holes 86, 86 in the housing stays 64, 64 are aligned with first lighting apparatus mounting holes 87, 87 in the annular stay 65. The housing stays 64, 64 and the annular stay 65 are integrally fixed together using bolts 88, 88 and nuts 89, 89.

The nuts 89, 89 may be previously welded to inner peripheral surfaces of the first lighting apparatus mounting holes 87, 87. This facilitates the assembly.

On the other hand, the lighting system cover 53 is fitted on the second lighting apparatus 52. Specifically, the lighting system cover 53 is placed over the second lighting apparatus 52; then, the screws 84, 84 are passed through the bosses 81, 81 from the rearward direction. This secures the lighting system cover 53 on the second lighting apparatus 52.

The second lighting apparatus 52 fitted with the lighting system cover 53 assembled as described above is mounted on the annular stay 65 on which the first lighting apparatus 51 is mounted. Specifically, the bolts 68, 68 are passed through the second lighting apparatus mounting holes 73, 73 from the forward direction and secured with the nuts 74, 74 from the opposite direction.

The second lighting apparatus 52 is supported by the annular stay 65 supported by the housing 62. Specifically, the second lighting apparatus 52 is supported by using the housing 62 for the first lighting apparatus 51. This eliminates the need for using a housing for supporting the second lighting apparatus 52. This promotes reduction in weight of the headlight 20.

The outer peripheral cover 59 is mounted on the substrate housing 69. By mounting the spacing portion cover 57 on the substrate housing 69 in advance, the second lighting apparatus 52, the spacing portion cover 57, and the outer peripheral cover 59 can be integrally mounted on the annular stay 65.

Specifically, assembly accuracy of the lighting system cover 53 relative to the second lighting apparatus 52 can be enhanced. Further, mounting processes can be simplified because parts can be subassembled in advance.

A lighting apparatus according to a second embodiment of the present invention will be described with reference to FIG. 8.

Second Embodiment

Figure 8:
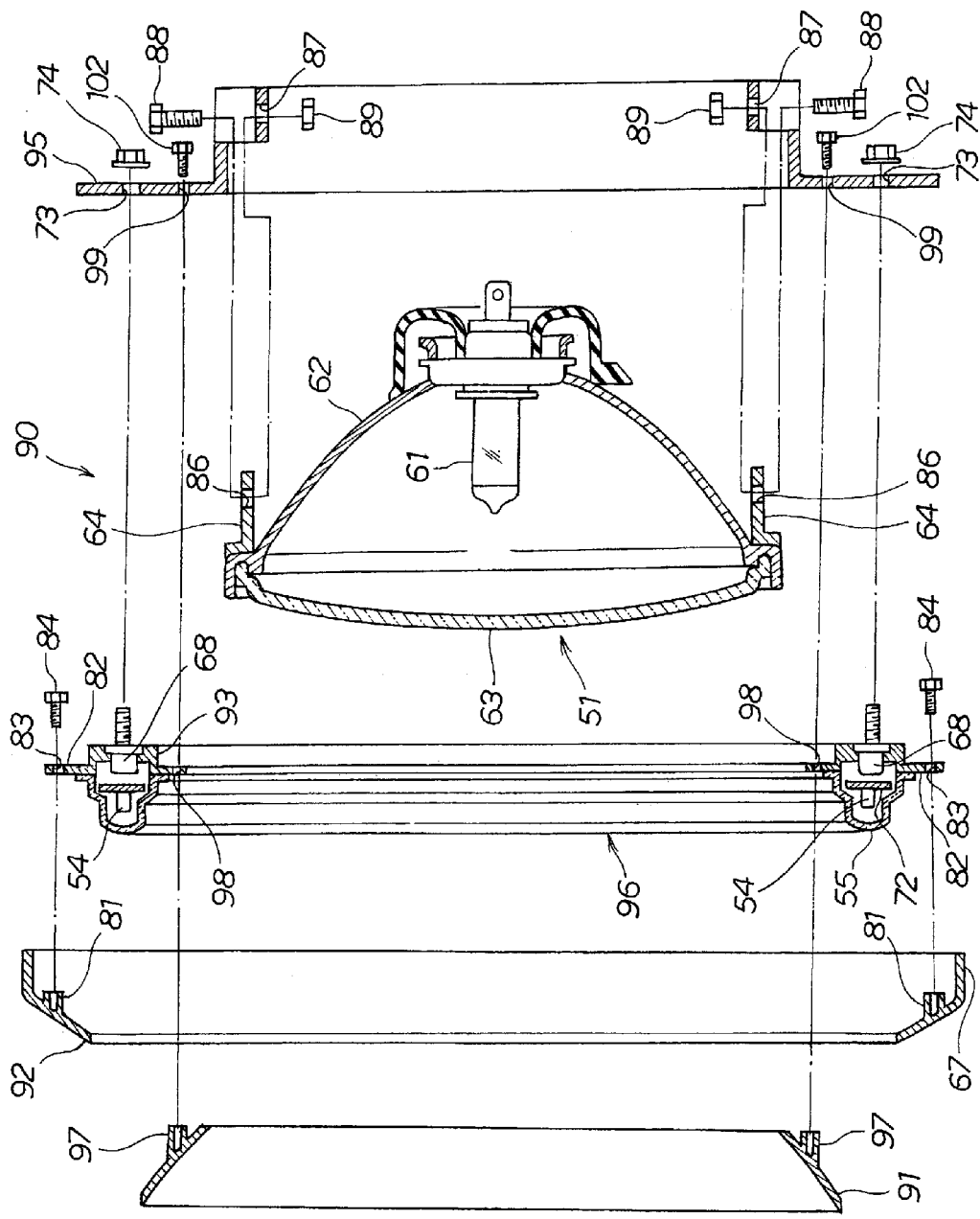
FIG. 8 is an exploded view showing a lighting system according to a second embodiment of the present invention.

Referring to FIG. 8, a headlight 90 according to the second embodiment of the present invention does not include any spokes (identified by reference numeral 58 in FIG. 2), so that a spacing portion cover 91 and an outer peripheral cover 92 are separately fixed relative to a substrate housing 93.

To assemble the headlight 90 having arrangements as described above, a first lighting apparatus 51 is first mounted on an annular stay 95.

On the other hand, the outer peripheral cover 92 is mounted on the substrate housing 93.

A second lighting apparatus 96 fitted with the outer peripheral cover 92 is then mounted on the annular stay 95 on which the first lighting apparatus 51 is mounted.

Finally, a boss 97 of the spacing portion cover 91, an inner peripheral portion mounting hole 98 disposed on an inner peripheral portion of the substrate housing 93, and a spacing portion cover mounting hole 99 made in the annular stay 95 are aligned with each other and the spacing portion cover 91, the substrate housing 93, and the annular stay 95 are integrally secured with each other using a bolt 102.

The second lighting apparatus 96 is supported by the annular stay 95 supported by a housing 62. Specifically, the second lighting apparatus 96 is supported by using the housing 62 of the first lighting apparatus 51. This eliminates the need for using a housing for the exclusive use for supporting the second lighting apparatus 96. This promotes reduction in weight of the headlight 90.

The headlight 90 assembled as described above will be described below with reference to FIG. 9.

Figure 9:
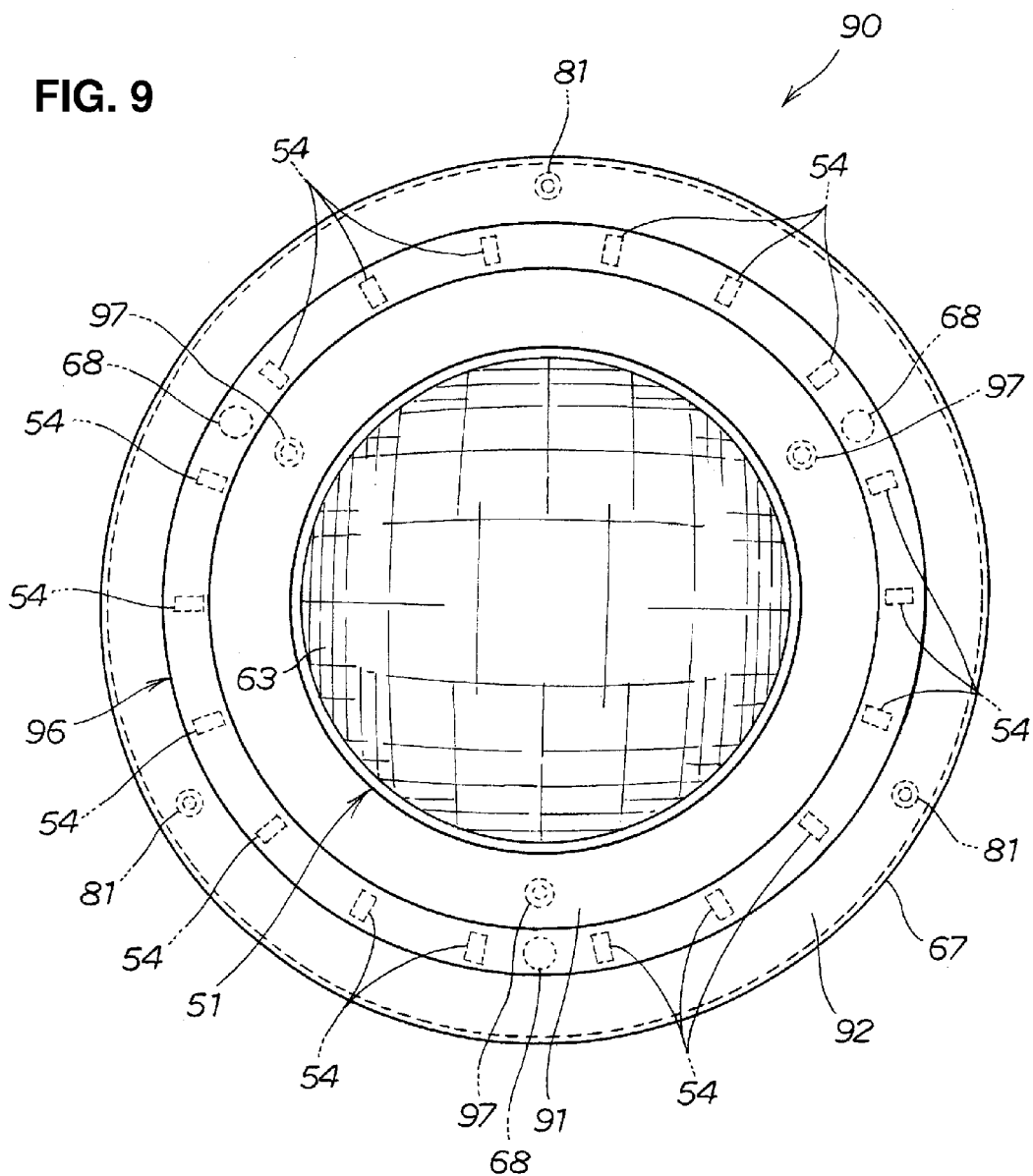
FIG. 9 is a front elevational view showing the lighting system according to the second embodiment of the present invention.

Referring to FIG. 9, the headlight 90 according to the second embodiment of the present invention, though having no spokes (identified by reference numeral 58 in FIG. 2), achieves the following effects.

Specifically, the second lighting apparatus 96 includes a plurality of light-emitting elements 54 disposed annularly. The use of the light-emitting elements 54 for the light source eliminates the need for a reflector around the light source. This leads to reduction in the number of parts used, which is advantageous.

In addition, the headlight 90 includes the spacing portion cover 91 for covering a spacing portion (identified by reference numeral 66 in FIG. 3). Hiding the spacing portion improves appearance of the headlight 90.

In addition, the annular stay (identified by reference numeral 95 in FIG. 7) is covered with the outer peripheral cover 92. This hides the annular stay for improved appearance of the headlight 90.

Another example of fixing the substrate (identified by reference numeral 72 in FIG. 5) will be described with reference to FIG. 10.

Figure 10:
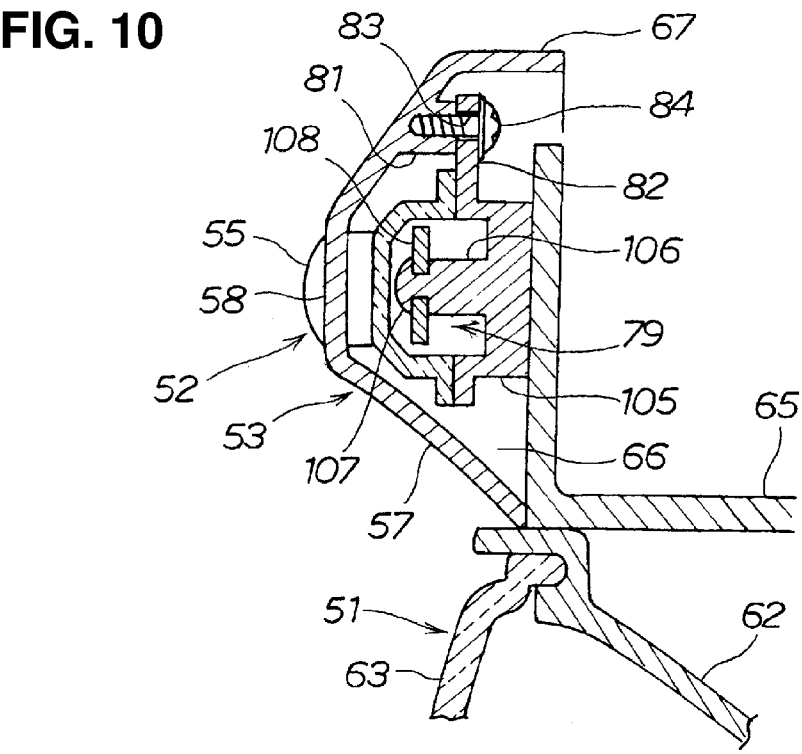
FIG. 10 is a diagram for illustrating a modified example of FIG. 6.

Referring to FIG. 10, a lens 55 is joined to an upper surface of a substrate housing 105 to which a substrate 108 is fixed through heat staking and a lighting system cover 53 is then placed.

The effects of the embodiments of the present invention can be achieved even from the arrangement of the substrate housing 105 as described above.

Specifically, the substrate 108 may be fixed through the so-called heat staking, in addition to the screwing (see FIG. 5). Further, any other fixing technique may be employed as long as the technique properly fixes the substrate 108 to the substrate housing 105.

The heat staking technique will be described in detail below with reference to FIGS. 11A and 11B.

Figure 11A:
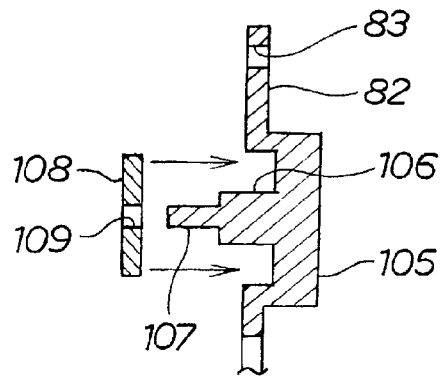
FIGS. 11A and 11B are exploded views showing an essential portion of FIG. 10.

Referring to FIG. 11A, the substrate 108 is joined to the substrate housing 105 such that a leading end portion 107 of a protruding portion 106 of the substrate housing 105 is passed through a mounting hole 109 in the substrate 108.

The protruding portion 106 is formed of a thermoplastic resin.

Figure 11B:
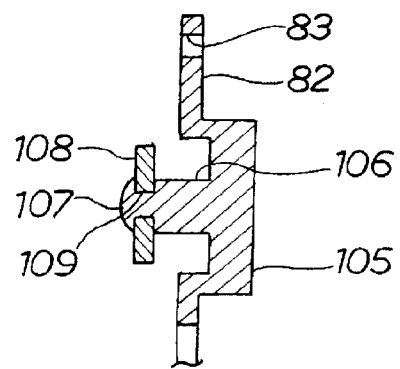

Referring to FIG. 11B, the leading end portion 107 is heated to be softened and the leading end portion 107 is staked over the substrate 108.

The lighting system according to the embodiments of the present invention has been described using, as an example, the headlight for a saddle-riding type vehicle. The invention is applicable to not only a flasher of the saddle-riding type vehicle, a headlight or a position light of a four-wheel vehicle, and a single lighting apparatus, but also other types of uses.

The lighting system according to the embodiments of the present invention is particularly suitable for the headlight and the front flasher of the saddle-riding type vehicle. If the lighting system is used for these purposes, the lighting system is disposed near the steering handlebar. The lighting system according to the embodiments of the present invention is light in weight. Effect from the weight of the lighting system on operability of the saddle-riding type vehicle can therefore be inhibited. Specifically, the lighting system according to the embodiments of the present invention is particularly suitable for use in which the lighting system is disposed near the steering handlebar of the saddle-riding type vehicle.

In addition, the direction in which the lighting system illuminates is not limited only to a substantially forward direction as in the embodiments of the present invention; rather, the illuminating direction may be rearward, upward, or sideward of the vehicle.

According to an embodiment of the present invention, the lighting system further includes a spacing portion cover for covering a spacing portion that is formed between an outer periphery of the first lighting apparatus and an inner periphery of the second lighting apparatus to extend from the outer periphery of the first lighting apparatus to the inner periphery of the second lighting apparatus.

According to an embodiment of the present invention, the lighting system further includes an outer peripheral cover that is extended from an outer periphery of the second lighting apparatus so as to be spaced apart from a center of the second lighting apparatus to thereby cover the annular stay.

According to an embodiment of the present invention, the outer peripheral cover is integrated with the spacing portion cover by being connected to a spoke that extends radially from an outer periphery of the spacing portion cover.

According to an embodiment of the present invention, the light-emitting elements are disposed such that two adjoining light-emitting elements sandwich the spoke in a front view.

According to an embodiment of the present invention, the second lighting apparatus includes a substrate for supporting the light-emitting element and a substrate housing on which the substrate is mounted. Further, a mounting portion on which the substrate is mounted on the substrate housing is covered with the spoke.

According to an embodiment of the present invention, the spacing portion cover is disposed on the substrate housing, or the outer peripheral cover is disposed on the substrate housing.

According to an embodiment of the present invention, the second lighting apparatus includes a light-emitting surface or a light-emitting body that is disposed at a position protruding in an illuminating direction from a light-emitting surface or a light-emitting body of the first lighting apparatus in a side view.

embodiment of the present invention, the second lighting apparatus is supported by the annular stay that is in turn supported by the housing. Specifically, the second lighting apparatus is supported by using the housing of the first lighting apparatus. This eliminates the need for using a housing for the second lighting apparatus for supporting the second lighting apparatus. This promotes reduction in weight of the lighting system.

In addition, according to the embodiment of the present invention, the second lighting apparatus includes the plurality of light-emitting elements disposed annularly. The use of the light-emitting elements for the light source ensures uniform annual illumination even without using a special reflector around the light source.

According to the embodiment of the present invention, the lighting system includes the spacing portion cover for covering the spacing portion. Hiding the spacing portion behind the spacing portion cover improves appearance of the lighting system.

According to the embodiment of the present invention, the lighting system further includes the outer peripheral cover that is extended from the outer periphery of the second lighting apparatus and covers the annular stay. This hides the annular stay for improved appearance of the lighting system.

According to the embodiment of the present invention, the outer peripheral cover is integrated with the spacing portion cover by being connected to the spoke. As compared with an arrangement in which the outer peripheral cover and the spacing portion cover each are individually fixed, a smaller number of support portions are used to promote reduction in the number of parts used and the number of assembly man-hours.

According to the embodiment of the present invention, the light-emitting elements are disposed such that two adjoining light-emitting elements sandwich the spoke in a front view. Specifically, the light-emitting elements are disposed so as not to overlap the spoke in a front view. Consequently, the lighting system requires only a minimum essential number of light-emitting elements, thus contributing to reduction in the number of parts used.

According to the embodiment of the present invention, the mounting portion is covered with the spoke. This improves appearance of the lighting system.

According to the embodiment of the present invention, the spacing portion cover is disposed on the substrate housing, or the outer peripheral cover is disposed on the substrate housing. Specifically, the spacing portion cover or the outer peripheral cover is disposed on the substrate housing. By mounting the spacing portion cover or the outer peripheral cover on the substrate housing in advance, the second lighting apparatus, the spacing portion cover, and the outer peripheral cover can be integrally mounted on the annular stay. Specifically, mounting processes can be simplified.

According to the embodiment of the present invention, the light-emitting surface or the light-emitting body of the second lighting apparatus is disposed at a position protruding from the light-emitting surface or the light-emitting body of the first lighting apparatus in a side view. When a third person views the lighting system from an obliquely forward direction, the first lighting apparatus looks closer on the side of the third person relative to a center of a circular ring of the second lighting apparatus. This produces an effect as if a black part of an eye were closer on the side of the third person (as if the first lighting apparatus chased the third person).

The lighting system according to the embodiments of the present invention is suitable for a headlight of a saddle-riding type vehicle.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A lighting system comprising:
   a first lighting apparatus including a housing and a light source covered with the housing;
   an annular second lighting apparatus disposed around the housing and including a plurality of light-emitting elements disposed annularly so as to be radially spaced apart from an outer periphery of the housing of the first lighting apparatus; and
   an annular stay supported by the housing to support the second lighting apparatus and including an inner peripheral surface radially in contact with an outer peripheral surface of the housing.

2. The lighting system according to claim 1,
   wherein the stay includes an annular first portion to which the second lighting apparatus is attached, and a second portion having a cylindrical shape and extending from an inner periphery of the first portion along an illuminating direction of the first lighting apparatus, the second portion including the inner peripheral surface radially in contact with an outer peripheral surface of the housing.

3. The lighting system according to claim 2,
   wherein the first portion includes a first surface and a second surface opposite to the first surface in the illuminating direction, the second lighting apparatus being provided on the first surface to emit light along the illuminating direction, and
   wherein the second portion extends from the second surface of the first portion along the illuminating direction toward a opposite side of the second lighting apparatus and includes a fixing portion connected with the housing of the first lighting apparatus.

4. The lighting system according to claim 1,
   wherein the first lighting apparatus includes a lens through which light of the light source passes and attached to the housing, and
   wherein the housing includes a lens attaching portion to which the lens is attached, the lens attaching portion including the outer peripheral surface radially in contact with the inner peripheral surface of the stay.

5. A lighting system comprising:
   a first lighting apparatus including a light source covered with a housing;
   an annular second lighting apparatus disposed around the housing and including a plurality of light-emitting elements disposed annularly so as to be radially spaced apart from an outer periphery of the first lighting apparatus;
   an annular stay supported by the housing to support the second lighting apparatus; and
   a spacing portion cover that extends from the outer periphery of the first lighting apparatus to an inner periphery of the second lighting apparatus to cover a spacing portion that is formed between the outer periphery of the first lighting apparatus and the inner periphery of the second lighting apparatus.

6. The lighting system according to claim 5, further comprising:
   an outer peripheral cover that extends from an outer periphery of the second lighting apparatus so as to be spaced apart from a center of the second lighting apparatus to cover the annular stay.

7. The lighting system according to claim 6,
   wherein the outer peripheral cover is connected to a spoke that extends radially from an outer periphery of the spacing portion cover to be integrated with the spacing portion cover.

8. The lighting system according to claim 7,
   wherein the light-emitting elements are disposed such that two adjoining light-emitting elements among the light-emitting elements sandwich the spoke in a front view.

9. The lighting system according to claim 7,
   wherein the second lighting apparatus comprises
      a substrate that supports the light-emitting elements, and
      a substrate housing on which the substrate is mounted, and
   wherein the spoke covers a mounting portion in which the substrate is mounted on the substrate housing.

10. The lighting system according to claim 9,
    wherein the spacing portion cover or the outer peripheral cover is disposed on the substrate housing.

11. The lighting system according to claim 8,
    wherein the second lighting apparatus comprises
       a substrate that supports the light-emitting elements, and
       a substrate housing on which the substrate is mounted; and
    wherein the spoke covers a mounting portion in which the substrate is mounted on the substrate housing.

12. The lighting system according to claim 11,
    wherein the spacing portion cover or the outer peripheral cover is disposed on the substrate housing.

13. The lighting system according to claim 5,
    wherein the second lighting apparatus includes a light-emitting surface or a light-emitting body that is disposed at a position protruding in an illuminating direction with respect to a light-emitting surface or a light-emitting body of the first lighting apparatus in a side view.

14. The lighting system according to claim 6,
    wherein the second lighting apparatus includes a light-emitting surface or a light-emitting body that is disposed at a position protruding in an illuminating direction with respect to a light-emitting surface or a light-emitting body of the first lighting apparatus in a side view.

15. The lighting system according to claim 7,
    wherein the second lighting apparatus includes a light-emitting surface or a light-emitting body that is disposed at a position protruding in an illuminating direction with respect to a light-emitting surface or a light-emitting body of the first lighting apparatus in a side view.

16. The lighting system according to claim 8,
    wherein the second lighting apparatus includes a light-emitting surface or a light-emitting body that is disposed at a position protruding in an illuminating direction with respect to a light-emitting surface or a light-emitting body of the first lighting apparatus in a side view.

17. The lighting system according to claim 9,
wherein the second lighting apparatus includes a light-emitting surface or a light-emitting body that is disposed at a position protruding in an illuminating direction with respect to a light-emitting surface or a light-emitting body of the first lighting apparatus in a side view.

18. The lighting system according to claim 10,
wherein the second lighting apparatus includes a light-emitting surface or a light-emitting body that is disposed at a position protruding in an illuminating direction with respect to a light-emitting surface or a light-emitting body of the first lighting apparatus in a side view.

19. The lighting system according to claim 11,
wherein the second lighting apparatus includes a light-emitting surface or a light-emitting body that is disposed at a position protruding in an illuminating direction with respect to a light-emitting surface or a light-emitting body of the first lighting apparatus in a side view.

20. The lighting system according to claim 12,
wherein the second lighting apparatus includes a light-emitting surface or a light-emitting body that is disposed at a position protruding in an illuminating direction with respect to a light-emitting surface or a light-emitting body of the first lighting apparatus in a side view.

\* \* \* \* \*